United States Patent [19]
Kranzler et al.

[11] Patent Number: 5,805,596
[45] Date of Patent: Sep. 8, 1998

[54] METHOD FOR IN-BAND COMMUNICATION OF MANAGEMENT INFORMATION IN A BACKPLANE ARCHITECTURE OF A STACKABLE ETHERNET REPEATER

[75] Inventors: David A. Kranzler, Belmont; Wen-Tsung Tang, Santa Clara; Edwin Ibe, San Jose, all of Calif.

[73] Assignee: 3 Com Corporation, Santa Clara, Calif.

[21] Appl. No.: 576,802

[22] Filed: Dec. 21, 1995

[51] Int. Cl.$^6$ .............................. H04B 3/36; H04L 25/20
[52] U.S. Cl. ...................... 370/445; 370/501; 370/502
[58] Field of Search .................... 370/239, 252, 370/253, 422, 423, 425, 426, 445, 446, 474, 246, 247, 242, 243, 248, 249, 492, 501, 502, 465; 375/211, 213; 379/338; 340/853.7, 425.1, 425.2

[56] References Cited

U.S. PATENT DOCUMENTS

| | | | |
|---|---|---|---|
| 5,396,495 | 3/1995 | Moorwood et al. | 370/85.11 |
| 5,430,762 | 7/1995 | Vijeh et al. | 375/211 |
| 5,550,803 | 8/1996 | Crayford et al. | 370/13 |
| 5,574,726 | 11/1996 | Chan et al. | 370/402 |
| 5,636,214 | 6/1997 | Kranzler et al. | 370/445 |

OTHER PUBLICATIONS

Specification, "DP83850CVF 100 Mb/s TX/T4 Repeater Interface Controller (100RIC™)" Preliminary, National Semiconductor, Dec., 1995, pp. 1–40.

Specification, "DP83856 100 Mb/s Repeater Information Base" Advance Information (undated) pp. 1–26.

*Primary Examiner*—Benedict V. Safourek
*Assistant Examiner*—Seema S. Rao
*Attorney, Agent, or Firm*—Townsend and Townsend and Crew LLP; Kenneth R. Allen

[57] ABSTRACT

In a backplane architecture for a logical stackable Ethernet repeater for an Ethernet network having a plurality of stackable repeater modules, each one of the stackable repeater modules being connectable via bus-type signal lines to one another for communicating packets via bus-type signal lines, and each one of said stackable repeater modules including a plurality of ports for connection to stations, a method is provided for communicating management information wherein a management module collects information about packets on the backplane from repeater modules, and the repeater modules transmit packet information only via bus-type signal lines. In a specific embodiment, transmitting comprises appending after each packet at each source port of each repeater module an information footer having a select number of information units, and conveying each packet with the information footer on the bus-type signal lines. The management module reads the information footer from the bus-type signal lines to collect information about the source of each packet and compiles statistical information from direct interpretation of each packet.

20 Claims, 2 Drawing Sheets

METHOD FOR IN-BAND COMMUNICATION OF MANAGEMENT INFORMATION IN A BACKPLANE ARCHITECTURE OF A STACKABLE ETHERNET REPEATER

BACKGROUND OF THE INVENTION

This invention relates to stackable Ethernet repeaters which support the collection of management information. This specific embodiment provides a low-cost way to collect management information, when compared with prior art. It does so by communicating management information in-band, during the idle period between Ethernet transmissions.

Ethernet repeaters form star-wired networks when end stations are attached to the repeater's ports. The repeater performs the function of broadcasting data received from one attached end station out to all other attached end stations. Stackable Ethernet repeaters refer to stacks of individual repeater units, connected together by a common backplane, to form one logical repeater. A repeater in the stack which receives a packet from its attached end station will transmit that packet out over the common backplane, so that it can be forwarded by each repeater in the stack to its attached end stations.

Ethernet repeater products typically include an entity which collects management information on the repeater unit as a whole, as well as on the traffic which passes through it. Several standards have been written to define the type of management information collected by a managed logical repeater. Stackable Ethernet repeaters typically embed this management entity in a separate unit, known as a management unit, which is included in the repeater stack. The management unit listens promiscuously to the traffic on the repeater backplane, and derives information about each packet as it is transmitted over the backplane. The management information collected includes such statistics as the number of bytes in a repeated packet's data field, or whether or not the packet was corrupted in some way. The management unit associates such information with the port of origin, so that it can be correlated to an end station.

The prior art in stackable repeater design, as demonstrated by commonly-available repeater chipsets, is to transmit the source port identification over a dedicated management bus, as well as various other management information more easily collected by the repeater than by the management unit. The management unit then can associate the source port identification and other information with the packet received from the backplane.

What is needed is a mechanism for eliminating the dedicated management bus architecture.

SUMMARY OF THE INVENTION

According to the invention, in a backplane architecture for a logical stackable Ethernet repeater for an Ethernet network having a plurality of stackable repeater modules, each one of the stackable repeater modules being connectable via bus-type signal lines to one another for communicating packets via bus-type signal lines, and each one of said stackable repeater modules including a plurality of ports for connection to stations, a method is provided for communicating management information wherein a management module collects information about packets on the backplane from repeater modules, and the repeater modules transmit packet information only via the bus-type signal lines shared with the communicated packets. In a specific embodiment, transmitting comprises appending to each packet at each source port of each repeater module an information footer having a select number of information units, and conveying each packet with the information footer on the bus-type signal lines. The management module reads the information footer from the bus-type signal lines to collect information about the source of each packet and compiles statistical information from direct interpretation of each packet. The footer is stripped off by the repeaters in the stack, as it is used for management purposes only.

This in-band signalling saves the cost and electromagnetic noise that would be associated with an extra set of drivers and receivers used for transmitting management information.

The invention will be better understood by reference to the following detailed description in connection with the accompanying drawings.

DESCRIPTION OF THE SPECIFIC EMBODIMENTS

The present invention is described in the context of a specific embodiment. However, the invention is not so limited and is capable of being used in other embodiments, such as 10 Mbps Ethernet networks.

Figure 1:
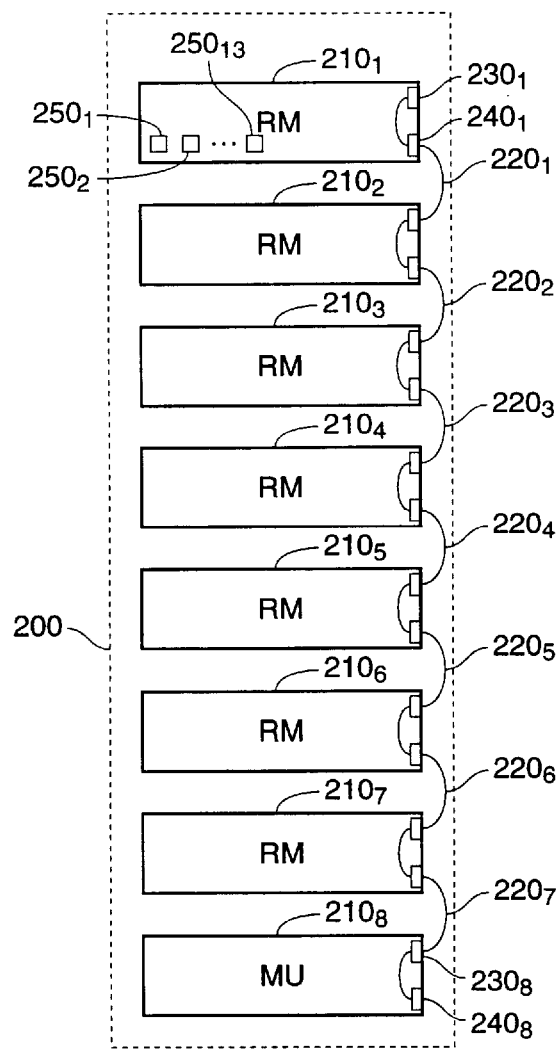
FIG. 1 is a general illustration of an Ethernet network in accordance with the invention.

FIG. 1 illustrates a logical stackable managed repeater 200 according to a specific embodiment of the invention. According to the specific embodiment, stacked repeater 200 includes seven identical stackable repeater modules 210x (where x=1 to 7), plus a management unit (260).

In other embodiments, logical stacked repeater 200 may include more or even less than seven repeater modules. For example, even one repeater module plus one management module may be used as a logical stackable managed repeater, to which further repeater modules may be stacked as network demands increase in the future. The stackable architecture of the logical stacked repeater allows for great flexibility in determining the number of repeater modules in a stacked repeater in the network, and enables growth and economical expansion of the size of the network in terms of connected stations. Furthermore, the management module 260 may reside in any position in the stackable managed Ethernet repeater 200.

Repeater modules 210x are connected to each other by cables 220y (where y=1 to 7), to form one logical stacked repeater 200. Each repeater module 210x includes an upstream interface 230x to connect to another identical repeater module directly above it, and a downstream interface 240x to connect to another identical repeater module directly below it. Cable 220y is a 68-pin cable with 68-pin connectors at both ends. Repeater modules 210x exchange packet and management information over cables 220y at 100 Mbps. The management unit 260 is attached to the repeater modules in the same fashion. The information, exchanged in parallel, includes: 6 bits of data and control (4 data bits and 1 control bit and 1 parity bit); a data envelope signal to indicate when valid packet data is being exchanged; and a data clock signal.

Each repeater module 210x also includes at least thirteen ports, each port being connectible to a station or to a standard Ethernet wire. These ports may be, for example, RJ45 ports, with each port connected to a receive pair and a transmit pair in a standard maximum 100 meter wire run to a station. For example, repeater module 2101 includes ports 250i (where i=1 to 13). The thirteen ports in each of the other six repeater modules may then be connected to thirteen stations. Thus in a specific embodiment, logical stackable managed repeater 200 connects to 91 stations in the 100 Mbps Ethernet network. In alternate embodiments, each repeater module 210x may include a different number of ports.

Figure 2:
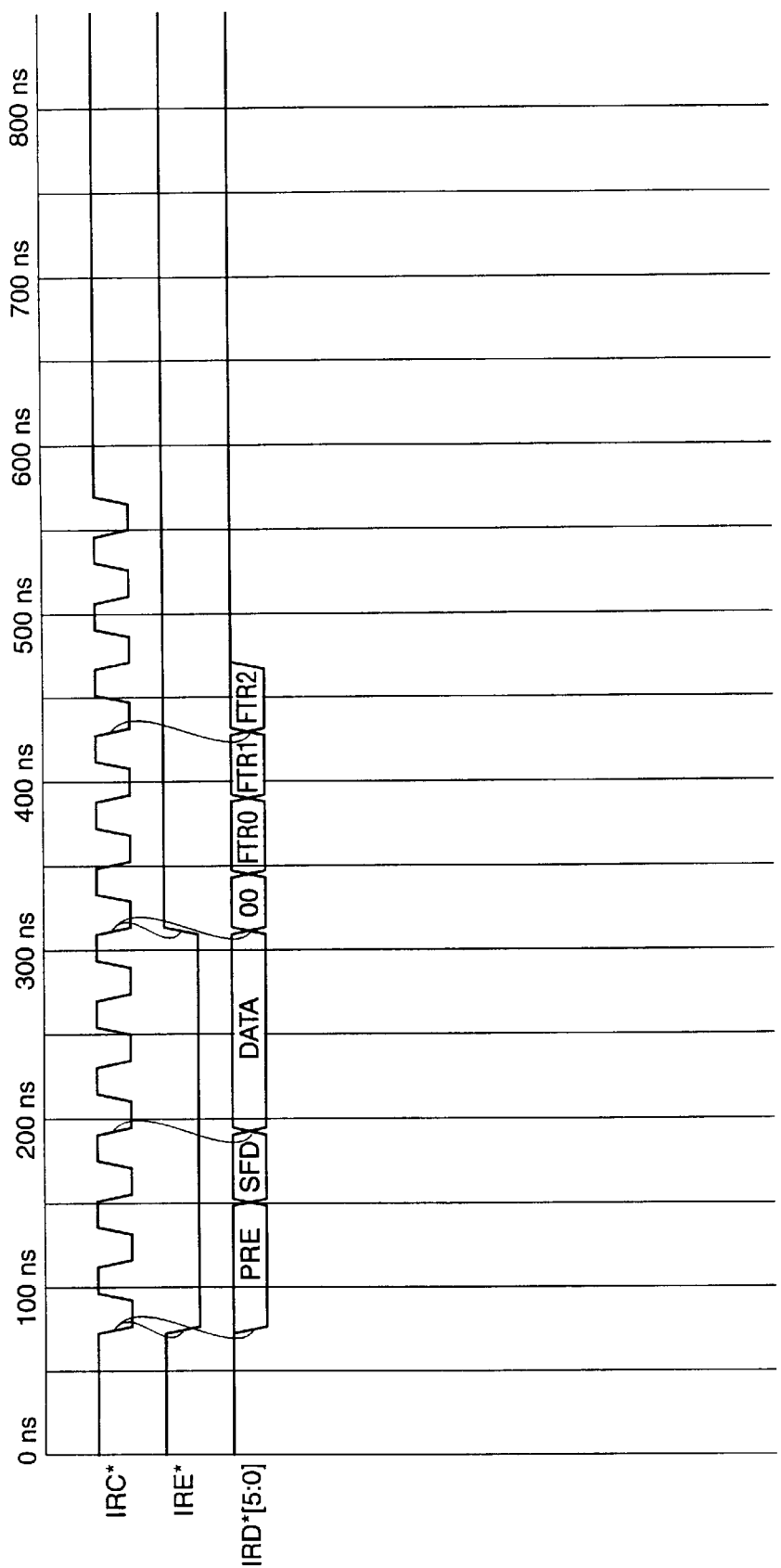
FIG. 2 is a timing diagram illustrating the appending of packet information.

FIG. 2 shows the timing of the information footer relative to the packet. There are three signals used to communicate both packets and footer data. IRC* is a clock signal used by the forwarding repeater and the management unit to sample IRD*[5:0], which is the data on the bus. In this embodiment, IRC* is at 25 MHz, and the IRD* bus is 6 bits wide, but the invention is not so limited and can be used to transmit data at a variety of bit rates. IRE* is a data envelope which frames the Ethernet packet data. The footer is transmitted over IRD*[5:0], after the trailing (rising) edge of IRE*. The fact that the footer lies outside the IRE* envelope signal facilitates the stripping of the footer by the forwarding repeaters.

In this specific embodiment, IRC*, IRE*, and IRD*[5:0] are shown as negative-true signals (hence the *). This is a characteristic of the logic family used to exchange the information on the backplane bus. However, the invention is not so limited and can be used with a variety of logic families.

In this specific embodiment, the footer is composed of three information units:

FTR0 contains the 5-bit identification of the source repeater that received the packet to which the footer is appended, plus an odd parity bit.

FTR1 contains the Jabber flag, as well as the 4-bit identification of the source port within the source repeater that received the packet to which the footer is appended, plus an odd parity bit.

FTR2 contains the Data Rate Mismatch flag, as well as four unused bits, plus an odd parity bit.

The invention is not limited to this format; other widths and content definitions of the footer may be used.

The invention has been explained with relation to specific embodiments. It is to be understood that the above description is intended to be illustrative and not restrictive. Many embodiments will be apparent to those of skill in the art upon reviewing the above description. The scope of the inventions should, therefore, be determined not with reference to the above description, but should instead be determined with reference to the appended claims, along with the full scope of equivalents to which such claims are entitled.

Attached as appendix A is a specification of the Inter-Repeater Bus Interface (IRBD) which includes the packet footer according to the invention.

APPENDIX A 8.3　　Inter-Repeater Bus Interface (1RBI)

8.3.1.　　Introduction

The 1RBI bus is intended primarily for interconnecting 100BaseT repeater ASICS either on the same board or in connected units via some form of cabled or backplane bus. Its operation is derived directly from that of the inter-RIC bus used in other 3Com products, in which repeater chips can send packets to each other over a shared bus. However, the collision resolution and packet footer mechanisms are unique to this product.

8.3.2　　Bus signals

The inter-repeater bus consists of 12 signals which are described below:

ACTVTY　　This is a 3-level signal which indicates how many ports in the repeater stack are detecting non-idles at any given time. ACTVTY is used to resolve collisions between repeater boxes. Every repeater box that has at least one port active sinks current from ACTVTY. If not repeater boxes have

APPENDIX A-continued active ports, than ACTVTY sits at a voltage level of 3.3 V. If one repeater box has at least one port that is detecting non-idles, then it pulls ACTVTY down (asynchronously) to a level of ~2.3 V. If two or more repeater boxes each have at least one active port apiece, then they all pull ACTVTY down to a level of ~1.8 V. In this way, every box in the stack can detect whether or not the IHB is idle, or is repeating a packet, or is resolving a collision.
Note that in order to manage the capacitive load on ACTVTY, no box has more than one driver. Therefore, ANYXN* is used in conjunction with ACTVTY to determine the true state of the repeater (see below). The two signals together are analogous to the CRS and COL signals in the MII specification.

ANYXN*　　Any repeater box that has two or more active ports asserts ANYXN* low (asynchronously), to indicate the collision to all other boxes on the IHB. ANYXN* is necessary to indicate this state, since no box has more than one ACTVTY driver. Therefore, other repeaters in the stack would enter the COLLISION state if (1) ACTVTY is at 1.8 V or less, or (2) ANYXN* is asserted.

IRE*　　Inter-repeater enable. This is the envelope signal for data on the bus. It is asserted during the repeated packet's preamble by the repeater unit that is receiving the packet. IRE* is deasserted after the end-of-stream delimiter is detected. All devices on the bus may drive or sense this line. IRE* is analogous to RX_DV in the MII specification.

IRC*　　Inter-repeater clock. This is the clock which allows transefr of data between devices on the bus. In the repeater ASIC its source is the receiving port. It therefore has no fixed phase relationship with the local transmit clock on any device but is the same nominal frequency (25 MHz). All devices on the bus may drive or sense this line.

IRD*[5–0]　　Inter-repeater data bits 5:0. This is the decode data bus used for packet transfer. The IRC* signal rising edges are bit-cell-centred on the data. The lower four lines are used for data nibbles while IRD*[4] indicates control information which is described below. All six lines are used to transmit the packet footer (sec section 8.4 on page 41) All devices on the bus may drive or sense these lines.
IRD*[4:0] are asserted during the preamble of the repeater packet, synchronously to IRC*. Start-of-stream and end-of-stream delimiters are not included in the IRD*5:0 data stream. IRD*[3:0] are analogous to RXD[3:0] in the MII specification; IRD*[4] is analogous to RX_ER.

BASEX*　　100BaseX repeaters are present in the stack. A 100BaseX repeater unit will pull this static, wire-OR'd line low, indicating that IRD*[4:0] should be driven with decoded data only, and IRD*[5] should remain inactive (except during the packet footer). If BaseX* is not asserted -- i.e. the stack is composed solely of CAT3 repeater units -- then encoded, T4 line-level data will be exchanged over IRD*[5:0].

T4*　　T4 repeaters are present in the stack. This is used to determine if the stack is behaving as a Class II, T4 line-level repeater, or a Class I, mixed-media repeater. TX repeaters will assert T4* if a T4* slice is attached, or if the repeater is operating in 4500-byte mode (4500B bit is set in the Device Configuration Register).

8.3.3　　Data protocol

This section decsribes the data sent over the IRD* [4:0] lines.
The fundamental data unit is a 5 bit wide symbol at a nominal frequency of 25 MHz. The five bits are used to send data nibbles on the least significant 4 bits plus a control bit on the most significant bit. The encoding of the data is shown in the following table:

| Hex Data | Binary 5 bit code |
|---|---|
| 0 | 00000 |
| 1 | 00001 |
| 2 | 00010 |
| 3 | 00011 |
| 4 | 00100 |
| 5 | 00101 |
| 6 | 00110 |
| 7 | 00111 |
| 8 | 01000 |
| 9 | 01001 |
| A | 01010 |
| B | 01011 |
| C | 01100 |

APPENDIX A-continued

| | |
|---|---|
| D | 01101 |
| E | 01110 |
| F | 01111 |
| I symbol | 10000 |
| J symbol | 10000 |
| K symbol | 10000 |
| T symbol | 10011 |
| R symbol | 10000 |
| Code Error | 10000 |
| Unused | 10000 |
| Unused | 10000 |
| Unused | 10000 |
| Unused | 10000 |
| Unused | 10000 |
| Unused | 10000 |
| Unused | 10000 |
| Unused | 10000 |
| Unused | 10000 |

All unused codes in the above table should never be transmitted out onto the IRB. If an invalid symbol is received from a port, the 10000 code is transmitted out onto IRD*[4:0] to signal the code error to all re-transmitting repeaters. If a repeater receives one of the unused codes above from the IRB, it is a transmission error and the repeater should replace it with a HALT in its outgoing data stream.

Data is sent on the bus in packets which conform to the normal Ethernet size rules, i.e. 64 to 1518 bytes in length. The preamble consists of some number of 4'h0 symbols, followed by at least one 4'h5 symbol. The SFD is a 4'hD pattern which corresponds to the Ethernet SFD when sent ls bit first. The normal Ethernet packet follows with DA, SA etc followed by the normal 32 bit FCS. The data is sent least significant nibble first for each byte in the packet, except for the FCS which is sent ms nibble first with the nibbles bit reversed. This is to mimic the normal Ethernet data transmission order of ls bit first except for the FCS which is sent as a 32 bit sequence, ms bit first.

The following example illustrates the transmission order:
DA = 08004e010203
SA = 08004e040506
FCS = abcdef01
Packet sent as:
5 5 5 . . . 5 5 D 8 0 0 0 e 4 1 0 2 0 3 0 8 0 0 0 e 4 4 0 5 0 6 0 . . . <Data> . . . 5 d 3 b 7 f 0 8 T R
Note the bit reversal of each nibble of the FCS and the ordering of the nibbles.

8.4 Packet Footer

After every non-collision carrier event, the original Port N sends a packet footer out one clock cycle after the trailing edge of IRE*[10]. The footer identifies the Port N port group and port number to the SPAM statistics collection agent, which then update counters appropriately. The footer also contains some packet statistics that are most reliably collected by the repeater, rather than SPAM.

The footer format is shown below.

Table 7
Packet Footer Format

| | IRD*[5] | IRD*[4] | IRD*[3] | IRD*[2] | IRD*[1] | IRD*[0] |
|---|---|---|---|---|---|---|
| Nybble 0 | Parity | PGN4 | PGN3 | PGN2 | PGN1 | PGN0 |
| Nybble 1 | Parity | RcvJab | Port3 | Port2 | Port1 | Port0 |
| Nybble 2 | Parity | SPR3 | SPR2 | SPR1 | SPR0 | DRM |

Parity == Odd parity bit for IRD*[4:0][11]
PGN[4:0] == Port Group Number (see section 7.2.0.2 on page 18)
Port[3:0] == Port Number
RcvJab == Receive Jabber Status
DRM == Data Rate Mismatch
SPR[3.0] == Spares

8.5 Timing Diagrams

After the trailing edge of IRE* following a non-collision carrier event, there is one clock cycle of "dead time", with IRD*[5:0] = 6'h00. This is followed by the footer and 6 IRC* pulses.

---

[10]. A 5'h00 is inserted between the last FCS symbol and the first footer symbol; see FIG. 12.

[11]. Odd parity is used to detect the condition when an IHB cable is pulled out mid-footer; if IRD*[5:0] all float to 2 V on the IHB, than that symbol would be read as a parity error.

---

What is claimed is:

1. In a backplane architecture for a logical stackable Ethernet repeater for an Ethernet network having a plurality of stackable repeater modules, each one of said plurality of stackable repeater modules being interconnected via a plurality of bus-type signal lines forming a single bus for communicating packet data via said single bus, and each one of said stackable repeater modules including a plurality of ports for connection to stations, a method for communicating comprising:

providing a management module coupled to said single bus for collecting management information about packets on a per packet basis on said backplane from all of said repeater modules via said single bus; and transmitting said packet data and said per packet management information about said packets including a source port identifier via said single bus, said packet data being communicated along said single bus between at least two of said plurality of stackable repeater modules.

2. The method according to claim 1 wherein said transmitting step comprises:

appending said management information at the end of each said packet as an information footer; and conveying each said packet with said management information footer on said single bus.

3. The method according to claim 1 wherein each one of said stackable repeater modules is wired-OR connected to said signal lines of said single bus.

4. The method according to claim 1, wherein said single bus comprises the only bus line used for data communication between each of said stackable repeater modules.

5. In a backplane architecture for a logical stackable Ethernet repeater for an Ethernet network having a plurality of stackable repeater modules, each one of said plurality of stackable repeater modules being interconnected via plurality of bus-type signal lines forming a single bus for communicating packet data via said single bus, and each one of said stackable repeater modules including a plurality of ports for connection to stations, a method for communicating comprising:

providing a management module coupled to said single bus for collecting management information about packets on a per packet basis on said backplane from all of said repeater modules via said single bus; and transmitting said packet data and said per packet management information about said packets including a source port identifier via said single bus, said packet data being communicated along said single bus between at least two of said plurality of stackable repeater modules, said transmitting step comprising:

appending after each said packet at each source port of each said repeater module a management information footer comprising a select number of information units;

conveying each said packet with said management information footer on said single bus; and reading, at said management module, said management information from said single bus.

6. The method according to claim 5, further including the step of propagating, from said repeater modules to said stations, each said packet without said management information footer.

7. The method according to claim 5 wherein said appending step comprises adding a select number of said information units to convey source port identification and source repeater identification.

8. The method according to claim 7, wherein said appending step comprises adding an information bit carrying a jabber flag indicative of excessive packet length.

9. The method according to claim 8, wherein said appending step comprises adding an information bit carrying a data rate mismatch flag indicative of a transmission baud rate outside of a defined range.

10. The method according to claim 9 wherein said appending step comprises adding a parity bit for each said information unit.

11. The method according to claim 5 wherein each one of said stackable repeater modules is wired-OR connected to said bus-type signal lines of said bus.

12. The method according to claim 5 wherein said bus includes data lines, control lines, data envelope lines, and at least one data clock signal line.

13. The method according to claim 5 wherein said Ethernet network is a 10 Mbps Ethernet network.

14. The method according to claim 5 wherein said Ethernet network is a 100 Mbps Ethernet network.

15. The method according to claim 5, wherein said single bus comprises the only bus line used for data communication between each of said stackable repeater modules.

16. A backplane network comprising:

a plurality of stackable repeater modules, a bus line interconnected to each of said plurality of stackable repeater modules for communicating data and management information therethrough, wherein said data is communicated along said bus between at least two of said stackable repeater modules; and a management module coupled to said bus line for collecting said management information about said data on said backplane from all of said repeater modules.

17. The backplane network of claim 16, wherein each of said plurality of stackable repeater modules comprises:

means for appending information onto said data, said information comprising status of said repeater module; and means for transmitting said appended data along bus line.

18. The backplane network of claim 17, wherein each of said plurality of stackable repeater modules further comprises:

means for receiving said appended data present along said bus line; and means for removing said information from said received appended data.

19. The backplane network of claim 18, wherein each one of said stackable repeater modules is wired-OR connected to said bus line.

20. The backplane network of claim 19, wherein said bus line includes data, control, data envelope, and data clock signal lines.

* * * * *